United States Patent
Abbott et al.

[15] 3,684,769
[45] Aug. 15, 1972

[54] THERMALLY REVERSIBLE POLYESTER POLYURETHANES

[72] Inventors: Norman Basil Abbott; Charles Brian Chapman, both of Pontypool, England

[73] Assignee: Imperial Chemical Industries Limited, London, England

[22] Filed: May 4, 1970

[21] Appl. No.: 34,628

[30] Foreign Application Priority Data
May 15, 1969 Great Britain..........24,774/69

[52] U.S. Cl. ...260/75 NK, 260/77.5 TB, 260/77.5 SP
[51] Int. Cl. ..................C08g 22/12, C08g 22/16
[58] Field of Search........................260/77.5 TB, 75 TN, 75.5 SP

[56] References Cited
UNITED STATES PATENTS

| | | |
|---|---|---|
| 2,929,800 | 3/1960 | Hill....................260/77.5 |
| 2,279,745 | 4/1942 | Stevenson..................260/78 |
| 2,801,990 | 8/1957 | Seeger et al. ................260/75 |
| 3,192,185 | 6/1965 | Achterhof et al............260/75 |
| 3,248,371 | 4/1966 | Damusis..................260/77.5 |
| 3,317,463 | 5/1967 | Schonfeld et al. ...........260/47 |
| 3,357,954 | 12/1967 | Kirkaldy......................260/75 |
| 3,438,922 | 4/1969 | Ueno et al. ...............260/29.3 |

*Primary Examiner*—Donald E. Czaja
*Assistant Examiner*—H. S. Cockeram
*Attorney*—Cushman, Darby and Cushman

[57] ABSTRACT

A polyester- or polyether- urethane segmented polymer of substantially homogeneous structure, comprising polyester or polyether segments with reversibly thermolabile urethane cross-links between neighboring polymer chains, and processes for producing such polymers.

12 Claims, No Drawings

THERMALLY REVERSIBLE POLYESTER POLYURETHANES

The present invention relates to improved polymers and particularly melt-spinnable or shapeable polymers, as well as to processes for producing such polymers.

It also relates to shaped articles such as fibers filaments, films or coatings made from such polymers.

It has long been recognized that polymeric materials fall into two main classes: thermoplastic and thermosetting. Thermoplastic polymers usually have few or no cross-links between the polymer molecular chains, any intermolecular forces being easily broken by heat energy so that the polymer chains can easily flow over one another. This type of polymer is used for melt spinning, for example, wherein heat is applied to the polymer until it becomes liquid and said liquid is extruded to some shape such as a filament, which filament on cooling becomes solid again.

Thermosetting polymers are usually relatively deformable at some stage in their manufacture, but by reason either of their chemical constitution or from the action of suitable additives, when heated they form more and more cross-links and so become less and less deformable.

Clearly, thermosetting polymers are unsuitable for melt-spinning or shaping, since they tend to become less and less deformable, i.e., more and more viscous, when held in the melting vessel, finally forming a gel.

However, cross-linked polymers in general have properties at normal temperatures which are superior to those of non-crossed-linked polymers, when applied in certain fields. Their resistance to and recovery from deformation by an applied stress for instance is greater and they retain their resistance to deformation over a wider range of temperature. Furthermore, having numerous strong internal bonds they are less susceptible to solution by solvents, an important factor in many practical applications. For this reason many processes have been put forward whereby thermoplastic materials are shaped, for instance by pouring them while in a fluid state into moulds or by extrusion, and later treating them to convert them to products whose shape is no longer modifiable by heat nor very susceptible to solvents. Vulcanization is a well known example of such a process.

Such treatments may entail subsequent heat treatment, sometimes at a temperature above the melting point of the polymer and so not applicable for example to spun filaments, reaction with chemical reagents, exposure to various types of radiation and the like.

Polymers requiring the aforesaid heat treatment near or at their melting point are also frequently difficult to control during processing. For instance, in a melt fabrication process the cross-linking reaction is likely to take place during the melting stage and the polymer may gel in the apparatus. Chemical treatments which involve diffusion of the reactive cross-linking agent from a gas or solution phase into the solid polymer tend to be slow, and since they involve heterogeneous systems (solid-gas, or solid-liquid), may lead to non-uniform cross-linking. Exposure to radiation may lead to harmful concurrent degradation reactions.

Clearly it would be advantageous to have a polymer with reversibly thermolabile cross-links defined in that the majority of said links are open at some convenient temperature whereat they have substantially no tendency to reform and whereat said polymer may be easily deformed, but which links are reformed as the material cools to normal temperatures. Such polymers, the manufacture of which is described hereinafter, have advantages in many fields of industry, for instance as coatings, where they may be applied for instance in the form of a suspension or an emulsion or as powder coatings or in any other suitable manner. Such polymers, as well as any articles made therefrom, such as fibers, filaments, films or coatings, fall within the scope of the present invention.

In the present specification the term cross-linked polymer is used to indicate a polymer the molecules of which are linked together to form a continuous three dimensional network which cannot be molecularly dispersed by a solvent not exerting chemical attack on said polymer, but which may be swollen by such a solvent. As a measure of the degree of cross-linking of the molecular network, one can measure the extent to which the polymer is swollen by a solvent in equilibrium with it. This is the well known gel swelling weight test, (G.S.W.), described hereinafter. The less the density of cross-links the more the gel or polymer is swollen, i.e., the more solvent it can imbibe. A desirable polymer, having uniformity of properties and good characteristics, must be uniformly cross-linked and a sample thereof should swell in a "solvent" with substantially complete retention of its shape. Furthermore, the sample must not break up into small fragments in the solvent. In practice some weight fractions of the polymer in the sample will not be part of the cross-linked network, and will dissolve in the solvent. This soluble material is known as the sol fraction. Ideally it should approach zero so that the polymer can withstand solvents without serious weight loss. Such properties of the desirable polymer should be retained to as great a degree as possible after the polymer has been heated and cooled again.

The term "reversible" is defined in this specification on the basis of measurements of the gel swelling weight (G.S.W.) and the sol fraction.

The Gel Swelling Weight is measured as follows:

A polymer sample is tested as described below in order to determine its G.S.W. and soluble material content. A known weight (about 0.5 gm) of dry polymer is placed in a 50 × 100 mm capped cylindrical bottle and 100 ml. of a suitable solvent added. The bottle is placed in a thermo-stat bath at 25.0° C for 48 hours. The swollen gel is then rapidly filtered on a tared paper, surface liquid blotted off, and returned on the paper to a tared capped weighing bottle. The gel is weighed in the bottle, and then the imbibed solvent removed by some suitable manner such as heating in vacuo, and the bottle reweighed. The gel swelling weight is given as the ratio of the weights of the solvent – swollen gel to the dry gel.

The difference in weight between the initial polymer sample and the dry gel, expressed as a percentage of the initial polymer weight, gives the percent soluble polymer, called herein the Sol Fraction.

Determinations are made in duplicate. The solvent used must clearly be a solvent for the particular polymer concerned, in its original non-cross-linked state. For many of the polymers falling within the scope of the present invention chloroform is a suitable solvent, but of course, other solvents may be required in particular cases. To test the polymer for reversibility a sample is tested as described above and a further sample is then melted at a suitable temperature and held at this temperature for 30 mins. After this it is annealed for 30 mins. at 100° C to 150° C and its G.S.W. and percent soluble material again measured. Examples of such reversibility measurements are given in the example hereinafter.

The temperature of test for the reversibility of cross-link formation is chosen to be between the melting temperature of the material, as measured by the conventional Vicat Penetrometer test method and 300° C, and is preferably in the temperature region within which the material would be melt fabricated. The top limit of 300° C is chosen since at higher temperatures the polymers would probably be thermally unstable. For our purposes we have chosen a temperature for most test samples which is about 30° C above the observed Vicat softening point. This choice is arbitrary but in most cases preferable for practical reasons. Before submitting the polymer sample to the aforesaid reversibility measurements it is intended that it be thoroughly dried, e.g. at 60° C in vacuo over fresh phosphorus pentoxide for 24 hours.

It is preferable that the G.S.W. should lie between five times its original value and half of its original value and more preferably between three times and half of its original value and the percent soluble material should not rise to more than 70 percent, and preferably not more than 50 percent, after the aforesaid treatment.

The cross-linking reaction needs time to complete so that if a shaped polymer article wherein the cross-links are broken is rapidly cooled from the molten state it may not reform cross-links to a satisfactory degree and will probably break up into gel fragments when immersed in a solvent. In order to complete the cross-linking of such a rapidly cooled article it should be cured by heating. The curing temperature, at which cross-linking is favored, should be well below the deformation temperature or the formed articles will lose their shape on heating.

Of course the actual curing conditions will depend upon the chemistry of the cross-links in question. In the case of such cross-linked polymers, cure need not follow directly upon extrusion. Provided moisture for instance, or other reactive agents are excluded the cure may be carried out later.

One should not have to heat the polymer to an excessively high temperature in order to open the cross-links, for instance in melt-extrusion, or thermal degradation becomes a danger. On the other hand this cross-link temperature should be sufficiently high to provide a useful working range of temperatures for articles fabricated therefrom.

The present invention in one aspect therefore comprises a polyester- or polyether- urethane segmented polymer of substantially homogeneous structure, comprising polyester or polyether segments with reversibly thermolabile urethane cross-links, as defined hereinbefore, between neighboring polymer chains.

In another aspect said present invention comprises a polyester- or polyether- urethane segmented polymer of substantially homogeneous structure, comprising polyester or polyether segments with reversibly thermolabile urethane cross-links, as defined hereinbefore, between neighboring polymer chains, which after being heated for 30 minutes at a temperature between its melting temperature and 300° C and then annealed for 30 minutes at a temperature in the range of 100° C to 150° C gives a G.S.W. value, as defined hereinbefore, of between five times and one half of the value given by said polymer before said heating and annealing and a Sol Fraction, as defined hereinbefore, not more than 70 percent.

In a further aspect the present invention comprises a process wherein a diol, a dicarboxylic acid or its functional equivalent and a multifunctional compound, as defined hereinafter, are reacted together to form a substantially linear substantially non-cross-linked polyester, said polyester then being reacted with a diisocyanate in such amount that the number of available isocyanate groups are substantially equivalent to the number of isocyanate-reactable groups in said polyester.

In yet a further aspect the present invention comprises a process wherein a substantially linear substantially non-cross-linked polyester is mixed with a multifunctional compound, as hereinbefore defined, and said mixture then reacted with a diisocyanate in such amount that the number of available isocyanate groups are substantially equivalent to the number of isocyanate-reactable groups in said mixture.

The processes whereby the polymers of the present invention are made comprises as important features the preparation of a low molecular weight polyester or polyether, with isocyanate reactive groups pendant on the polymer chains. These pendant groups are then used to link neighboring chains via a suitable diisocyanate.

Said pendant groups are introduced by means of defined amounts of defined multifunctional compounds, as will be described hereinafter. An important feature of the processes of the present invention is that the amounts of multifunctional compound and of diisocyanate used are strictly controlled.

The invention will now be described, in no way limitatively, with reference to the preparation of isocyanate-cross-linked polyesters.

A substantially non-cross-linked polyester is prepared in a conventional manner from a suitable diol, a dicarboxylic acid or its functional equivalent and a small amount of a multifunctional compound of functionality greater than two.

The multifunctional compounds used in the present invention are defined as follows. Two of the functional groups of said multifunctional compound must be capable of taking part in a linear polymerization reaction. The other functional groups should be hydroxyl groups which are capable of reacting with an isocyanate radical to form a urethane, but which are of sufficiently low reactivity that they do not readily take part in a linear polymerization reaction. Preferably said other groups are phenolic hydroxyl groups. Suitable trifunctional compounds include glycerol, which under the conditions of our invention gives quite a useful product, and 5-hydroxy isophthalic acid. Suitable tetrafunctional compounds include 3,3' methylene bis(4-hydroxybenzoic acid). The multifunctional compounds used in the present invention may be aliphatic or aromatic but aromatic, phenolic compounds are preferred. Clearly any deleterious side-reaction, other than the reversibility of the urethane cross-link, which may occur at high temperature and which leads to the irreversible scission of the polyester molecule, or to destruction of the regenerated isocyanate and hydroxyl functions, is to be avoided as it will limit the extent of cross-link reversibility that can occur. For this reason of thermal stability, compounds with phenolic hydroxyls are preferred, and still more preferred are those wherein the phenolic groups are not ortho to the carboxylic acid groups.

Suitable diols for polyester preparation may be chosen from the general classes of aliphatic, cyclo aliphatic, and aryl aliphatic diol, for example, ethylene glycol, 1,4-butane diol, 1,6-hexamethylene diol, 1,2-propane diol, 2,2,-dimethyl 1,3-propane diol, triethylene glycol, bis(4-hydroxybutyl) ether, 1,4-cyclohexane diol, 1,4-cyclohexane dimethanol, 1,4-bis(hydroxymethyl)benzene, 1,4-bis(hydroxy ethoxy)benzene, N,N'-bis(hydroxyethyl)piperazine. Polymeric diols may also be used, for example, poly(oxyethylene)glycol, poly (oxypropylene)glycol, copoly(oxyethylene/oxypropylene) glycol, poly(oxytetramethylene)glycol. Mixtures of the above diols may also be used to prepare copolyesters.

Suitable dicarboxylic acids include, for example, succinic acid, adipic acid, sebacic acid, azelaic acid, αα'-dimethyl adipic acid, β-dimethyl glutaric acid, dimer acid, diglycollic acid, γ-oxydibutyric acid, 1,4-cyclohexane dicarboxylic acid, terephthalic acid, isophthalic acid, ρρ'-sulphonyl dibenzoic acid, 4,4'-dicarboxy benzophenone, N,N'-hexamethylene bis-trimellitimide. Mixtures of the above acids may also be used.

Polyesters may also be prepared from hydroxy acids, for examples, ε-hydroxycaproic acid, and from mixtures of these with diols and diacids.

As a useful alternative method of polyester preparation, the diol may be reacted with a functional equivalent of the dicarboxylic acid, e.g., the dialkyl ester of the dicarboxylic acid, optionally in the presence of well known ester interchange and polymerization catalysts.

In polyesters of the type described herein the proportion of the multifunctional compound is preferably arranged to be such that not less than one equivalent of potential branching function (e.g. phenolic hydroxyl) is present per 100 moles of dicarboxylic acid (or equivalent) unit, and not more than one equivalent per 5 moles of dicarboxylic acid or equivalent unit.

It is important at this stage to control the molecular weight of the polyester so that, dependent upon the proportion of multifunctional compound incorporated, irreversible cross-linking by inadvertant reaction of some of the slowly reacting hydroxylic groups of the multifunctional compound is not brought about. Said molecular weight should, in other words, be greater than 1000 but such that the polymer is substantially non-cross-linked.

The structures of polymers obtained in the aforesaid way have pendant hydroxyl groups and are, for instance, of the following form:

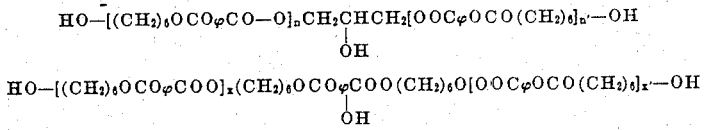

where π represents a benzene ring.

The equivalent weight of the polyester so obtained is then determined and said polymer is then reacted with an equivalent amount of a suitable diisocyanate.

Suitable diisocyanates include, for example, hexamethylene diisocyanate, 4,4'-diisocyanato dicyclohexyl methane, 4,4'-diisocyanato diphenyl methane, bis(isocyanato-methyl)durene, 1,4-diisocyanato durene. Aliphatic diisocyanates are preferred.

In practicing the method of the present invention, in order to obtain the particularly desirable polymers of said invention it is essential that the amount of diisocyanate used should be such that the isocyanate groups are substantially equivalent to the number of isocyanate-reactable groups in the polyester. This controlled procedure ensures that polymers produced are by nature homogeneous and require no further treatment or working in order to produce homogeneity. Such homogeneity is evinced by the substantial retention of sample shape in the G.S.W. test, described hereinbefore.

The polyesters are conveniently reacted with the diisocyanate in the melt under conditions as exemplified, and may also be reacted with the polyester initially in solution in an appropriate solvent. As reaction proceeds in the latter case the polymer separates as a swollen gel.

The diisocyanate has two simultaneous functions.

1. It links up the end-groups, i.e., chain-extends the polyester to form a polymer with a "spinnable" melt viscosity having a high M.W.

2. It links up pendant hydroxyl groups to form covalent cross-links.

The two types of link in (1) and (2) have differing degrees of stability to heat: the links at the chain ends, formed via aliphatic primary OH groups, are more stable than the cross-links formed via pendant secondary hydroxyl (glycerol) or phenolic hydroxyl (hydroxyisophthalic) groups.

Thus, the phenolic hydroxyl groups form urethane links which begin to dissociate at, say, 170° – 180° C., but the primary aliphatic groups may be stable up to 230° – 240° C. Hence, in this case, when the polymer is heated, the cross-links open up first. In the particular case being described, the dissociation temperature depends upon the diisocyanate compound used as well as upon the nature of the hydroxyl groups. Furthermore, the linking groups are liable to decomposition reactions at high temperatures – this is especially true of the ends of the polyester chains. Therefore in order to obtain "clean" dissociation of cross-links with minimum decomposition we prefer to use certain specific compositions, and especially those based on 5-hydroxyisophthalic acid or 3,3' methylene bis(4-hydroxybenzoic acid) and para-di(isocyanato cyclohexyl) methane.

An alternative procedure for the introduction of the multifunctional cross-linking agent, which may be applied when this reagent has hydroxyl or mixed hydroxylic and phenolic functional groups, is to add it as a monomeric compound rather than previously copolymerize it into a polyester. Thus, a linear polyester or polyether with terminal hydroxyl groups may be mixed with the multifunctional reagent, and then the mixture obtained reacted with a diisocyanate as described. In this way the diisocyanate couples together the polyester or polyether molecules and the cross-linking agent by urethane functions.

In polyethers of the type described herein the proportion of the multifunctional compound is preferably arranged to be such that not less than one equivalent of potential branching functions (e.g. phenolic hydroxyl) is present per 100 moles of repeat unit, and not more than one equivalent per 5 moles of repeat unit.

It is important that all the reactants taking part in all the aforedescribed reactions should be dry, in order for proper cross-linking to take place.

While the present invention has been particularly described with reference to a particular class of polymers, it will readily be appreciated by one skilled in the art that the essence of the present invention may be applied using a wide range of other suitable compounds in order to produce polymers of other classes having desirable thermally reversible cross-linking properties. Of course suitable catalysts and other adjuvants may be added in the process of polymer preparation.

EXAMPLE 1.

19 gm. of a copolymer prepared from 1,6 hexamethylene diol, terephthalic acid and 5-hydroxyisophthalic acid (20/1 ratio of acids), of Equivalent Weight E.W. = 600, were mixed with 3.77 gm. of para di(isocyanato cyclohexyl) methane and the mixture melted with stirring at 160° C. After 15 minutes the melt thickened and could not be stirred. The temperature was raised to 250° C when the melt could again be stirred.

A cold plug of this polymer was tested in a Vicat Penetrometer. The material showed a rubber region from about 130° C to 210° C, followed by melting over the range 210°–240° C.

EXAMPLE 2.

50.0 gm. of copolyhexamethylene (30:1 terephthalate/5-hydroxy isophthalate) of E.W. = 1400 (I.V. in chloroform at 25° C = 0.25) was mixed with 4.607 gm. of the trans, trans isomer of para di(isocyanato cyclohexyl)methane and the mixture melted together at 160° C under nitrogen. The temperature was raised to 250° C, stirring the melt continuously. After 5 minutes at 250° C the polymer was allowed to cool.

The product was insoluble in chloroform, with a mean G.S.W. = 44, and a Sol Fraction of 14 percent. The Vicat Penetrometer test showed a rubbery region extending from about 140° to 230° C, and melting at 250° C.

A sample of this polymer was melted under nitrogen at 280° C for 30 minutes, followed immediately by 30 minutes at 150° C to cure.

This remelted polymer had G.S.W. = 28, with a Sol Fraction of 24 percent.

EXAMPLE 3.

A batch of copolyester was prepared by reacting together dimethyl terephthalate (1940 gms., 10 moles), dimethyl 5-hydroxy isophthalate (105 gms., 0.5 mole), and 1,6-hexane diol (2478 gms., 21 moles). To these reactants were added n-butyl titanate (0.92 gm.) and tributyl tin oxide (1.23 gm.) as catalysts. After removal of methanol by ester exchange, the excess diol was distilled off, and polymerization effected by heating at 250° C and below 0.5 mm. pressure. The polymer so produced had an I.V. of 0.24 (in chloroform) and E.W. = 1352.

This polyester was melted and pumped at a rate of 250 gm./hr. into a small screw extruder where it was mixed with the mixed isomers of para di(isocyanato cyclohexyl) methane (PICM) pumped in at a rate of 24.5 gm./hr. The temperature of the extruder varied from 270° C to 315° C along the barrel.

Yarn was spun and wound up at 420 ft./min. The spun yarn was soluble in chloroform, but when annealed at 110° C for 1 hour it was only swollen by chloroform, without breakdown into fragments. A sample of the annealed yarn had G.S.W. = 23.4, with a Sol Fraction of 19 percent.

EXAMPLE 4.

A second batch of copolyester was prepared of the same composition as in the previous example. This polymer had an I.V. of 0.26, and E.W. = 1712.

700 gm. of the polyester were stirred in a vessel, fitted with an extrusion nozzle, at 200° C under nitrogen. 56.4 gm. of PICM (mixed isomers) were stirred in and the temperature raised to 250° C over 15 mins. The melt was then extruded, with the nozzle temperature at 280° C.

A sample of the extrudate had a G.S.W. = 11.3, and about 4 percent Sol Fraction.

The Vicat Penetrometer test showed a rubbery region from 142° to 190° C, followed by melting over the range of 190° to 250° C.

After heating at 280° C for 30 mins., followed by 30 mins. at 150° C, the polymer had G.S.W. = 40 and 13 percent Sol Fraction.

EXAMPLE 5.

A copolyester was prepared by reacting together 1,6-hexane diol (94 gm., 0.8 moles), dimethyl terephthalate (77.6 gm., 0.4 moles) and 3,3'-methylene bis(4-hydroxy benzoic acid) (2.88 gm., 0.01 mole). After 1 hour at 200° C, one drop of tetra n-butyl titanate was added and reaction continued over 4 hrs. raising the temperature to 240° C in 10° steps. Finally, the reaction was completed by heating at 0.5 mm. pressure for 3 hours.

The copolyester had I.V. = 0.21 (chloroform) and E.W. = 1740.

46.0 gm. of the dry polyester were mixed with 3.462 gm. of the trans, trans-isomer of PICM and stirred together at 160° C. The temperature was raised rapidly to 250° C and the melt stirred for 2 mins. The stirrer was removed, and the polymerization tube placed in a bath at 160° C for 30 mins. before cooling.

The solid polymer had G.S.W. = 50 (in chloroform) with 21 percent Sol Fraction. The Vicat Penetrometer showed a softening point of 250° C.

After heating at 280° C for ½ hour, followed by ½ hour at 150° C, a sample of the polymer had G.S.W. = 55, and 22 percent Sol Fraction.

EXAMPLE 6.

50 gm. of the copolymer of hexamethylene/glyceryl (16:1) terephthalate, of E.W. 867, was mixed with 7.6 gm. of trans, trans PICM and heated together at 150° C. At 200° C the melt solidified. At 275° C it could be stirred again.

The cold product had a G.S.W. = 30 in chloroform, with 15.8 percent soluble material.

Vicat Penetrometer test showed a rubbery region extending from about 130° – 200° C, followed by melting at about 260° C.

The polymer was melt spun at 278° C, and the yarn cured by heating at 100° C for one hour. The cured yarn had a G.S.W. of 34.5 in chloroform, with 40 percent Sol Fraction.

Vicat S. Pt. of initial polyester = 117° C.

EXAMPLE 7.

50.0 gm. of a copolyester of hexamethylene 1,6 - diol and glycerol (mole ratio 16:1) with terephthalic acid, and of equivalent weight = 1300, was mixed with 5.039 gm. of the trans, trans isomer of para di(isocyanate cyclohexyl) methane. Reaction was carried out under the conditions of Example 3, excepting that the product was cured by heating for 30 minutes at 120° C before testing.

The solid had G.S.W. = 23 and only 2 percent of it was soluble in chloroform.

A sample was remelted at 280° C for 30 minutes, and then heated at 150° C for 30 minutes. The remelted polymer swelled without break-up in chloroform and had G.S.W. = 30, with a Sol Fraction of 17 percent.

EXAMPLE 8.

200.0 gm. of a copolyester of the same composition as that used in Example 7, but with E.W. = 841 (I.V. = 0.15 and Vicat S. Pt. 142° C) was melted and stirred under nitrogen at 160° C. 20.0 gm. of hexamethylene diisocyanate was then added and the temperature raised to 205° C for 40 minutes. The stirrer was removed before the melt solidified.

The hard, white polymer had a G.S.W. = 21 and a Sol Fraction of 12.5 percent. The Vicat test showed a rubbery region extending from a 140° to 240° C.

A sample was melted at 280° C for 30 minutes, followed by heating at 150° C for 30 minutes. The product was rather soft and spongy but had a G.S.W. = 33.5 with 17.5 percent Sol Fraction.

EXAMPLE 9.

200 gm. of the copolyester of the above composition but having E.W. = 1105, were crushed and mixed with 23.7 gm. of solid trans, trans isomer of para di(isocyanato cyclohexyl) methane and the mixture fed into a screw extruder. Temperature along the barrel ranged from room temperature up to 250° C. Yarn was extruded and wound up at 500 f.p.m. The yarn was cured in an oven at 100° C for 2 hours. The yarn so produced was swollen by, but not dissolved in, chloroform.

EXAMPLE 10.

A copolyester was prepared by reacting ethylene glycol with succinic acid and 5-hydroxy isophthalic acid, the two acids being present in the molar proportions 40 : 1. The copolyester had I.V. = 0.66(chloroform) and E.W. = 2450.

150 gm. of this copolyester was stirred with the mixed isomers of PICM (8.10 gm.) at 160° C and then the temperature raised rapidly to 250° C for 2 mins. The polymer was then annealed at 150° C for 30 mins.

The Vicat Penetrometer showed a rubbery region from 100° to 230° C, with a melting point of 255° C. The G.S.W. was 16, with 9 percent Sol Fraction.

After heating at 280° C for 30 mins. and then at 150° C for 30 mins. The G.S.W. was 19, with 12.7 percent Sol Fraction.

EXAMPLE 11.

A copolyester was prepared by reacting succinic acid (118.0 gm., 1.0 mole) and 3,3'-methylene bis(4-hydroxybenzoic acid) (3.6 gm., 0.0125 mole) with ethylene glycol (68.25 gm., 1.1 mole). The copolyester had an I.V. of 0.22 in chloroform solution, and E.W. = 2,000.

90 gm. of this copolyester were mixed with 5.895 gm. of the trans, trans isomer of PICM, melted, and stirred together at 160° C. The stirrer was removed and the reactants held at 160° C for 30 mins. The solid mass of polymer was then allowed to cool.

The product had a G.S.W. = 14.6, and a Sol Fraction = 11.5 percent. The Vicat Penetrometer trace shows a rubbery region from 100° to 240° C followed by melting at about 250° C.

After heating at 280° C for 30 mins. followed by 30 mins. at 150° C the polymer had a G.S.W. = 22 and a Sol Fraction = 19 percent.

EXAMPLE 12.

A copolymer was prepared by copolymerizing 1:4 - butane diol with dimethyl terephthalate and 5-hydroxy dimethyl isophthalate in a 50:1 mole ratio. The copolyester had an equivalent weight of 2,400 and an I.V. of 0.65 in o-chlorophenol.

24.0 gm. of copolyester was mixed with 1.31 gm. of trans, trans para di(isocyanato cyclohexyl)methane, purged with dry nitrogen and placed in a bath at 240° C. After melting, the mix was stirred for 20 minutes. The melt viscosity increased but the mass could be stirred. Chips of the white, tough product were swollen in o-chlorophenol (at 60° C) without loss of original shape or break up into fragments.

Vicat Penetrometer test showed a softening point of 224° C, in comparison with 231° C for the initial polyester.

EXAMPLE 13.

Copolyethylene (adipate/5-hydroxy isophthalate (20/1)), prepared from ethylene glycol, adipic acid and 5-hydroxy-isophthalic acid, had I.V. = 0.19, and E.W. 1550, and carboxyl end groups by titration equal to 75.5 micro equivalents per gram.

50.0 gm. of this copolyester were stirred with 4.226 gm. of trans, trans - PICM at 150° C for 5 mins. The stirrer was removed and heating continued for a further 25 mins. The polymer was then allowed to cool. The product was a foamed rubbery plug, with a G.S.W. = 20.7 and a Sol Fraction = 5.6 percent. A disc was hot pressed to remove bubbles, and gave a Vicat melting point of 233° C, penetration beginning at about 200° C.

The reversibility test was carried out by heating at 230° C for 30 mins. followed by 30 mins at 150° C. A G.S.W. = 59, and Sol Fraction = 41 percent were obtained on the treated sample.

EXAMPLE 14.

A copolyester, polyethylene (adipate/3,3'-methylene bis(4-hydroxy benzoate) (40/1)), was prepared from ethylene glycol, adipic acid, and 3,3'-methylene bis(4-hydroxybenzoic acid). The copolyester had an I.V. = 0.18 (chloroform) and E.W. = 1050.

100.0 gm. of this copolyester was stirred with 12.480 gm. of trans, trans - PICM at 150° C for 5 mins. The stirrer was removed, and heating continued for a further 25 mins. The polymer was then allowed to cool. The rubbery product had a G.S.W. = 13.8 and a Sol Fraction = 4.7 percent and a Vicat softening point of 243° C (penetration beginning at about 235° C).

Reversibility test carried out at 280° C (30 mins.) followed by 30 mins. at 150° C gave a polymer with G.S.W. = 22.8 and Sol Fraction = 25.7 percent.

EXAMPLE 15.

A copolyester, poly(ethylene/2,2-dimethyl 1,3-propylene (7/3)) (adipate/5-hydroxy-isophthalate (40/1)), was prepared with I.V. 0.22 and E.W. 1730. The copolyester had 61 micro-equivalents of carboxyl end-groups per gram.

50 gm. of this copolyester were stirred with 1.431 gm. of 1,4-bis(2-hydroxy ethoxy) benzene and 5.662 gm. of trans, trans isomer of PICM, while heating to 250° C. After 2 mins. at 250° C the stirrer was removed, and the polymerization tube heated at 160° C for 30 mins. before cooling.

The rubbery polymer had a Vicat S. Pt. of about 140° C (ill-defined, the range extending to 200° C), a G.S.W. = 40 (chloroform), and about 40 percent Sol Fraction.

After heating at 280° C for 30 mins., followed by 30 mins. at 150° C, the G.S.W. was 65, with about 62 percent Sol Fraction.

EXAMPLE 16.

50 gm. of the copolyester of Example 15 were dried by heating for ½ hour at 110° – 120° C in high vacuum. 1,4-butane diol (1.301 gm.), and the trans, trans - PICM isomer (7.573 gm.) were then added to the cold polyester, the tube purged with dry nitrogen, and the mixture stirred together in an oil bath at 160° C. The temperature was rapidly brought up to 250° C for 10 mins. and the stirrer removed. The tube was then placed in a bath at 160° C for 30 mins.

The rubbery polymer had an ill-defined Vicat S. Pt. of 160° C (range 100° – 240° C), and a gel swelling weight of 18.5, with about 5 percent Sol Fraction, in chloroform.

It was also insoluble in dimethyl formamide, dimethyl acetamide, and m-cresol, swelling without fragmentation. These liquids dissolve linear polyesterurethanes of this type at room temperature.

After heating dry at 200° C for 30 mins., and at 150° C for 30 mins., the polymer had G.S.W. of 18, and about 4 percent Sol Fraction.

EXAMPLE 17.

A copolyester was prepared by heating together, under nitrogen, dimethyl terephthalate (121 gm.), dimethyl 5-hydroxyisophthalate (6.57 gm.), and 2,2-dimethyl propane 1,3-diol (130 gm.) with one drop of tetra n-butyl titanate. Methanol distilled off over 6 hours, the temperature of the reactants was brought up to 240° C over this time. The polymerization was completed by heating at 0.2 mm. for 4 hours.

The pale yellow, glassy solid had an I.V. of 0.19 (chloroform), and Vicat S. Pt. = 104° C, its equivalent weight was 1938.

50.0 gm. of the dry polyester were stirred with 3.379 gm. of trans, trans 4,4'-di(isocyanatocyclohexyl)methane at 160° C and the temperature rapidly brought up to 250° C. The stirrer was then removed, and the polymer placed in a second heating bath at 150° C for 30 mins., before cooling.

The product had G.S.W. = 17, with less than 1 percent soluble in chloroform. The Vicat Penetrometer test showed a plateau region from about 120° to 210° C followed by melting at 234° C.

After heating at 280° C for 30 mins. followed by 30 mins. at 150° C a sample of polymer had G.S.W. = 86 and 69% Sol Fraction in chloroform.

EXAMPLE 18.

47.6 gm. of poly(hexamethylene terephthalate) of E.W. 2380 were mixed with 0.92 gm. of glycerol and 6.55 gm. of 4,4'-di(isocyanatocyclo hexyl)methane at 170° C. The stirrer was removed, and heating continued for 1 hour. The polymer was then allowed to cool.

The product had a Vicat S. Pt. of 270° C with a plateau region from 150° – 240° C. It was insoluble in chloroform, with G.S.W. of 15.7, and less than 1 percent Sol Fraction.

After heating (dry) at 280° C for 30 mins. followed by 30 mins. at 150° C. the polymer had G.S.W. of 20 and 9.7 percent Sol Fraction.

EXAMPLE 19.

40.2 gm. of dry poly(tetramethylene oxide) of M.W. 2010 were mixed with 1.84 gm. of glycerol and 13.1 gm. of trans, trans PICM. One drop of dibutyl tin diacetate was added and the mixture stirred together at 100° C. It rapidly solidified, and was then heated at 150°C for 2 hours.

The rubbery product had a G.S.W. = 10 and a Sol Fraction of about 1 percent. The Vicat Penetrometer showed a softening point of about 230° C.

EXAMPLE 20.

60 gm. of dry copoly(ethylene/2,2-dimethyl 1,3-propylene (7/3) adipate) of E.W. 750 was heated at 120° C for 2 hours with 5.04 gm. of pyrogallol and 26.2 gm. of trans, trans PICM. The soft, rubbery product was non-crosslinked and completely soluble in chloroform.

The experiment was repeated using an equivalent proportion of phloroglucinol instead of pyrogallol, and a soluble, viscous liquid polymer was obtained.

These experiments further illustrate the need for functional groups of a sufficient degree of reactivity, and for differing degrees of reactivity.

What we claim is:

1. A polyester urethane segmented polymer of essentially uniform structure, comprising polyester segments with reversibly thermolabile urethane cross-links between neighboring polymer chains, said urethane cross-links being formed by reaction of isocyanate-reactable pendant hydroxyl groups on said polyester segments with a diisocyanate used in amounts such that the isocyanate groups present are essentially equivalent to the number of isocyanate-reactable hydroxyl groups on said segments, said polymer, after being heated for 30 minutes at a temperature between its melting temperature and 300° C. and then annealed for 30 minutes at a temperature in the range of 100° C. to 150° C., giving a GSW value of between five times and one half of the value given by said polymer before said heating and annealing and a Sol Fraction, not more than 70 percent.

2. A polymer as claimed in claim 1 which after being heated for 30 minutes at a temperature between its melting temperature and 30° C above this temperature and then annealed for 30 minutes at a temperature in the range of 100° C to 150° C gives a G.S.W. value of between five times and one half of the value given by said polymer before said heating and annealing and a Sol Fraction of not more than 50 percent.

3. A polymer as claimed in claim 1 which after being heated for 30 minutes at a temperature between its melting temperature and 30° C above this temperature and then annealed for 30 minutes at a temperature in the range of 100° C to 150° C gives a G.S.W. value of between three times and one half of the value given by said polymer before said heating and annealing and a Sol Fraction of not more than 50 percent.

4. A polymer according to claim 1 comprising the reaction production of para di(isocyanato cyclohexyl) methane and a copolymer of 1,6-hexamethylene diol, terephthalic acid and 5-hydroxyisophthalic acid.

5. A polymer according to claim 1 comprising the reaction product of the copolyester of dimethyl terephthalate, dimethyl 5-hydroxy isophthalate and 1,6-hexane diol and para di(isocyanato cyclohexyl) methane.

6. A polymer according to claim 1 comprising the reaction product of the copolyester of 1,6-hexane diol, dimethyl terephthalate and 3,3'-methylene bis(4-hydroxy benzoic acid) and para di(isocyanato cyclohexyl) methane.

7. A polymer according to claim 1 comprising the reaction product of para di(isocyanato cyclohexyl) methane and the copolyester of ethylene glycol, adipic acid or succinic acid and 5-hydroxy isophthalic acid or 3,3'-methylene bis(4-hydroxybenzoic acid).

8. A process for preparing a polyester-urethane segmented polymer of essentially uniform structure, comprising polyester segments with reversibly thermolabile urethane cross-links between neighboring polymer chains, said urethane cross-links being formed by reaction of isocyanate-reactable hydroxyl groups on said polyester segments with a diisocyanate used in amounts such that the isocyanate groups present are essentially equivalent to the number of isocyanate-reactable hydroxyl groups on said segments, said process comprising reacting an essentially linear polyester including isocyanate-reactable hydroxyl groups with a diisocyanate in such amount that the number of available isocyanate groups is substantially equivalent to the number of isocyanate-reactable hydroxyl groups in said polyester, and wherein said polyester is prepared from a multifunctional compound which is an aromatic dicarboxylic acid having at least one other pendant phenolic hydroxyl group capable of reacting with isocyanate to form a urethane, and the proportion of said aromatic dicarboxylic acid being such that not less than one equivalent of phenolic hydroxyl branching function per 100 moles of dicarboxylic acid units in the polyester and not more than one equivalent per 5 moles of dicarboxylic acid units is present.

9. A process according to claim 8, wherein the diisocyanate is para di(isocyanato cyclohexyl) methane and the polyester is a copolymer of 1,6-hexamethylene diol, terephthalic acid and 5-hydroxyisophthalic acid.

10. A process according to claim 8, wherein the diisocyanate is para di(isocyanato cyclohexyl) methane and the polyester is the copolyester of dimethyl terephthalate, dimethyl 5-hydroxy isophthalate and 1,6-hexane diol.

11. A process according to claim 8, wherein the diisocyanate is para di(isocyanato cyclohexyl) methane and the polyester is the copolyester of 1,6-hexane diol, dimethyl terephthalate and 3,3'-methylene bis(4-hydroxy benzoic acid).

12. A process according to claim 8, wherein the diisocyanate is para di(isocyanato cyclohexyl) methane and the polyester is the copolyester of ethylene glycol, adipic acid or succinic acid and 5-hydroxy isophthalic acid or 3,3'-methylene bis(4-hydroxybenzoic acid).

* * * * *